A. ANZELEWITZ.
CLOSING AND LOCKING ATTACHMENT FOR TWEEZERS, &c.
APPLICATION FILED MAY 24, 1919.
1,315,808.                                            Patented Sept. 9, 1919.
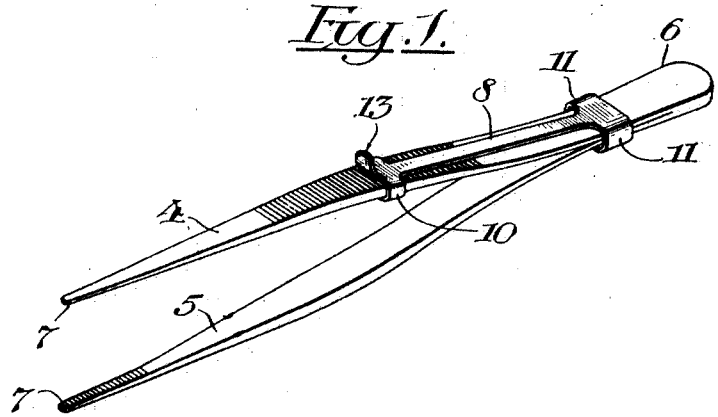
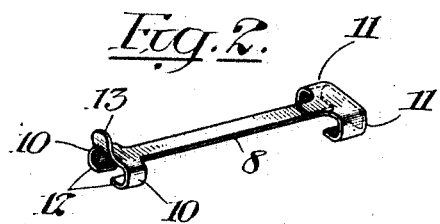
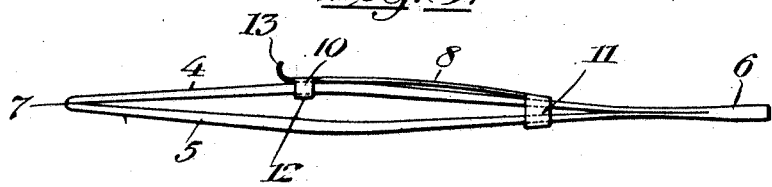
Inventor
Abraham Anzelewitz
by his Attorney
John R. Nolan

UNITED STATES PATENT OFFICE.

ABRAHAM ANZELEWITZ, OF NEW YORK, N. Y., ASSIGNOR TO HENRY LORSCH, HUGO SUSSFELD, EDMOND LORSCH, JULES SUSSFELD, EDWIN S. LORSCH, AND SIEGFRIED SCHIMMEL, COPARTNERS TRADING AS SUSSFELD, LORSCH & COMPANY, OF NEW YORK, N. Y.

CLOSING AND LOCKING ATTACHMENT FOR TWEEZERS, &c.

1,315,808.  Specification of Letters Patent.  Patented Sept. 9, 1919.

Application filed May 24, 1919. Serial No. 299,578.

*To all whom it may concern:*

Be it known that I, ABRAHAM ANZELEWITZ, a citizen of the United States, and resident of the city of New York, in the county of New York and State of New York, have invented certain new and useful Improvements in Closing and Locking Attachments for Tweezers, &c., of which the following is a specification.

The object of this invention is to provide a simple, durable and efficient attachment for tongs, tweezers, forceps or like implements having normally open jaws, whereby the said jaws can be readily closed and locked in gripping position and can thereafter be released with equal facility to permit them to resume their open condition.

With this object in view the invention comprises a flexible metal strip having integral therewith, and in spaced relation to each other, slide members adapted to be detachably mounted upon the legs of the implement as will be hereinafter described and claimed.

In the drawings—

Figure 1 is a perspective view of a pair of normally-open tongs or tweezers having my attachment thereon.

Fig. 2 is a perspective view of the attachment.

Fig. 3 is a side elevation of the implement as closed and locked by means of my device.

The jeweler's tongs or tweezers illustrated in Figs. 1 and 3 comprise a pair of elongated legs 4, 5 of spring metal suitably shaped and joined at one end 6, to cause them normally to diverge toward their free or gripping ends 7.

My improved closing and locking device comprises a flexible metallic strip 8 having at its respective ends two pairs of laterally projecting wings which are integral with the body of the strip and are bent down and turned inward to provide complementary guide members 10, 11, respectively.

To apply the device to the implement the in-turned lips 12 of the guide members 10 are spread apart and caused to embrace one of the legs (as 4); the other guide members 11 are slid upon the basal end 6 of the implement, and the lips 12 are turned inward under the proximate leg. To remove the device the lips 12 are again spread slightly and the guide members 11 are slid from the basal end of the implement.

When the device is mounted on the implement as above described the device can be readily moved longitudinally of the implement by pressure properly applied by the thumb of the user to an up-turned lip 13 (knob or the like) on the end of the strip 8 adjacent to the guide members 10. When the device is moved toward the gripping end 7 of the implement the member 11 embraces and slides on the converging ends of the two legs 4, 5 as seen in Fig. 3, and thereby forcibly closes and locks them in gripping position to a greater or less extent, as desired, against their inherent elasticity; thus securely retaining any object interposed between the gripping portions of the implement. When, however, the device is retracted toward the basal end of the implement the legs 4, 5 are released from the restraining action of the guide members 11 and thus permitted to resume their open condition.

It is to be noted that the flexibility of the strip enables it to conform to the curvature or inclination of the adjacent leg 4 as the device is moved longitudinally of the implement, and that the pliability of the lateral wings enables them to be bent to accommodate implements having legs of different widths and thicknesses.

An important feature of the device is that it can be readily applied to the implement without altering in any way the construction of the latter.

I claim—

A closing and locking attachment for tweezers and the like, comprising a flexible metal strip having at its respective ends pairs of laterally-projecting wings integral with the body of the strip, the wings of one pair being bent to provide slide members adapted to embrace the legs of the implement and the wings of the other pair being bent to provide slide members adapted to embrace one of said legs.

Signed at New York, in the county and State of New York, this 16th day of May, A. D. 1919.

ABRAHAM ANZELEWITZ.